United States Patent
Dulaney

(10) Patent No.: US 8,584,008 B1
(45) Date of Patent: Nov. 12, 2013

(54) METHOD AND SYSTEM FOR LAYOUT OF ANNOTATION DATA

(75) Inventor: Marissa Dulaney, Morgan Hill, CA (US)

(73) Assignee: Adobe Systems Incorporated, San Jose, CA (US)

( * ) Notice: Subject to any disclaimer, the term of this patent is extended or adjusted under 35 U.S.C. 154(b) by 511 days.

(21) Appl. No.: 12/390,199

(22) Filed: Feb. 20, 2009

(51) Int. Cl.
  *G06F 17/00* (2006.01)
(52) U.S. Cl.
  USPC ........... 715/247; 715/212; 715/230; 715/232; 715/233; 715/252
(58) Field of Classification Search
  USPC ......... 715/204, 226, 230, 231, 232, 233, 243, 715/247, 252
  See application file for complete search history.

(56) References Cited

U.S. PATENT DOCUMENTS

| 7,453,472 B2* | 11/2008 | Goede et al. | 345/634 |
| 7,703,011 B2* | 4/2010 | Yamakado et al. | 715/243 |
| 2006/0224950 A1* | 10/2006 | Takaai et al. | 715/512 |
| 2007/0294614 A1* | 12/2007 | Jacquin et al. | 715/512 |

OTHER PUBLICATIONS

Walkenbach, John. p. 69, 90-93, 559, 743 from "Excel 2007 Bible". Jan. 3, 2007, John Wiley & Sons.*
Tyson, Herb. p. 798, 800 from "Microsoft Word 2007 Bible". Mar. 12, 207, John Wiley & Sons.*
John Cherney, "Anyone else with a comment?",Sep. 1, 2007, SLA Connecting People and Information Wisconsin Chapter, pp. 1-6.*

* cited by examiner

*Primary Examiner* — Doug Hutton, Jr.
*Assistant Examiner* — Ariel Mercado
(74) *Attorney, Agent, or Firm* — Schwegman Lundberg Woessner P.A.

(57) ABSTRACT

Systems and methods may operate to display a plurality of data containers or bubbles within a user interface so that they do not overlap. Data containers are associated with a pointer or association indicium of fixed size that indicates the relationship between the data container and a target item. They systems and methods include, among other things, determining that two or more data containers will overlap if displayed in the user interface and performing a shift of the data containers, a resizing of the data containers, a shifting of the pointer, or a combination of the above. Additional apparatus, systems, and methods are disclosed.

19 Claims, 12 Drawing Sheets

| CUSTOMER | TYPE | CUMULATIVE | UNITS | ASP | NUM | CUMULATIVE2 |
|---|---|---|---|---|---|---|
| CUSTOMER500 | EDU | $42,726 | 500 | $32 | 10 | 510 |
| CUSTOMER140 | GOV | $1,823 | 140 | $59 | 500 | 500 |
| CUSTOMER68 | CORP | $9,691 | 68 | $117 | 283 | 373 |
| CUSTOMER60 | CORP | $7,740 | 60 | $126 | 179 | 290 |
| CUSTOMER70 | CORP | $82,400 | 70 | $93 | 300 | 300 |
| CUSTOMER | EDU | $17,570 | | | 163 | 213 |
| CUSTOMER150 | EDU | $6,276 | 150 | $37 | 216 | 216 |
| CUSTOMER95 | EDU | $3,443 | 95 | $47 | 200 | 200 |
| CUSTOMER100 | EDU | $97,765 | 100 | $38 | 0 | 200 |
| CUSTOMER80 | EDU | $1,895 | 80 | $47 | 200 | 200 |
| CUSTOMER111 | EDU | $67,164 | 111 | $32 | 155 | 165 |
| CUSTOMER50 | GOV | $7,278 | 50 | $67 | 0 | 0 |
| CUSTOMER81 | | | | | | |
| CUSTOMER33 | | | | | | |
| CUSTOMER90 | | | | | | |
| CUSTOMER50 | | | | | | |
| CUSTOMER50 | | | | | | |
| CUSTOMER50 | GOV | $5,954 | 50 | $55 | 130 | 132 |
| CUSTOMER50 | CORP | $90,366 | 50 | $55 | 89 | 117 |
| CUSTOMER50 | CORP | $3,492 | 50 | $55 | 107 | 127 |
| CUSTOMER39 | CORP | $83,088 | 39 | $70 | 126 | 126 |
| CUSTOMER35 | CORP | $55,883 | 35 | $72 | 125 | 125 |
| CUSTOMER80 | EDU | $8,518 | 80 | $31 | 121 | 121 |
| CUSTOMER60 | EDU | $1,057 | 60 | $40 | 120 | 120 |
| CUSTOMER63 | EDU | $9,154 | 63 | $40 | 120 | 120 |

Annotations:
- WAS: $7,279 BY: MARISSA DULANEY 8/13/08 AT 10:00 AM — UNDO CHANGE
- WAS: $70 BY: MALINALI SRIVANSTIVA 8/13/08 AT 10:00 AM — UNDO CHANGE
- WAS: 13 BY: PAUL ANASTASOPOULOS 8/13/08 AT 10:00 AM — UNDO CHANGE

| CUSTOMER | TYPE | CUMULATIVE | UNITS | ASP | NUM | CUMULATIVE2 |
|---|---|---|---|---|---|---|
| CUSTOMER500 | EDU | $42,726 | 500 | $32 | 10 | 510 |
| CUSTOMER140 | GOV | $1,823 | 140 | $59 | 500 | 500 |
| CUSTOMER68 | CORP | $9,691 | 68 | $117 | 283 | 373 |
| CUSTOMER60 | CORP | $7,740 | 60 | $126 | 179 | 290 |
| CUSTOMER70 | CORP | $82,400 | 70 | $93 | 300 | 300 |
| CUSTOMER | EDU | $17,570 | | | 163 | 213 |
| CUSTOMER150 | EDU | $6,276 | 150 | $37 | 216 | 216 |
| CUSTOMER95 | EDU | $3,443 | 95 | $47 | 200 | 200 |
| CUSTOMER100 | EDU | $97,765 | 100 | $38 | 0 | 200 |
| CUSTOMER80 | EDU | $1,895  150 | 80 | $47 | 160  200 | 140  200 |
| CUSTOMER111 | EDU | $67,164 | 111 | $32 | 155 | 165 |
| CUSTOMER50 | GOV | $7,278  130 | 50 | $67 | 0 | 0 |
| CUSTOMER81 | EDU | $5,954 | 110  50 | $55 | 130 | 132  120 |
| CUSTOMER33 | CORP | $90,366 | 50 | $55 | 89 | 117 |
| CUSTOMER90 | EDU | $3,492 | 50 | $55 | 107 | 127 |
| CUSTOMER50 | GOV | $83,088 | 39 | $70 | 126 | 126 |
| CUSTOMER50 | GOV | $55,883 | 35 | $72 | 125 | 125 |
| CUSTOMER50 | CORP | $8,518 | 80 | $31 | 121 | 121 |
| CUSTOMER80 | EDU | $1,057 | 60 | $40 | 120 | 120 |
| CUSTOMER60 | EDU | $9,154 | 63 | $40 | 120 | 120 |

WAS: $7,279
BY: MARISSA DULANEY 8/13/08 A
UNDO CHANGE

WAS: 13
BY: PAUL ANASTASOPOULOS 8/13/08 AT 10:00 AM
UNDO CHANGE

*FIG. 1*

| CUSTOMER | TYPE | CUMULATIVE | UNITS | ASP | NUM | CUMULATIVE2 |
|---|---|---|---|---|---|---|
| CUSTOMER500 | EDU | $42,726 | 500 | $32 | 10 | 510 |
| CUSTOMER140 | GOV | $1,823 | 140 | $59 | 500 | 500 |
| CUSTOMER68 | CORP | $9,691 | 68 | $117 | 283 | 373 |
| CUSTOMER60 | CORP | $7,740 | 60 | $126 | 179 | 290 |
| CUSTOMER70 | CORP | $82,400 | 70 | $93 | 300 | 300 |
| CUSTOMER | EDU | $17,570 | | | 163 | 213 |
| CUSTOMER150 | EDU | $6,276 | 150 | $37 | 216 | 216 |
| CUSTOMER95 | EDU | $3,443 | 95 | $47 | 200 | 200 |
| CUSTOMER100 | EDU | $97,765 | 100 | $38 | 0 | 200 |
| CUSTOMER80 | EDU | $1,895 | 80 | $47 | 200 | 200 |
| CUSTOMER111 | EDU | $67,164 | 111 | $32 | 155 | 165 |
| CUSTOMER50 | GOV | $7,278 | 50 | $67 | 0 | 0 |
| CUSTOMER81 | GOV | $5,954 | 50 | $55 | 130 | 132 |
| CUSTOMER33 | CORP | $90,366 | 50 | $55 | 89 | 117 |
| CUSTOMER90 | CORP | $3,492 | 50 | $55 | 107 | 127 |
| CUSTOMER50 | CORP | $83,088 | 39 | $70 | 126 | 126 |
| CUSTOMER50 | CORP | $55,883 | 35 | $72 | 125 | 125 |
| CUSTOMER50 | EDU | $8,518 | 80 | $31 | 121 | 121 |
| CUSTOMER39 | EDU | $1,057 | 60 | $40 | 120 | 120 |
| CUSTOMER35 | EDU | $9,154 | 63 | $40 | 120 | 120 |

Callouts on the table:
- WAS: EDU / BY: MARISSA DULAN / 8/13/08 AT 10:00 AM — UNDO CHANGE
- WAS: 217 / BY: CRAIG / 8/13/08 AT ... — UNDO
- WAS: 124 / BY: MALINA / 8/13/08 AT 1... — UNDO
- WAS: 13 / BY: PAUL ANASTASOPOULOS / 8/13/08 AT 10:00 AM — UNDO CHANGE

*FIG. 2*

| CUSTOMER | TYPE | CUMULATIVE | UNITS | ASP | NUM | CUMULATIVE2 |
|---|---|---|---|---|---|---|
| CUSTOMER500 | EDU | $42,726 | 500 | $32 | 10 | 510 |
| CUSTOMER140 | GOV | $1,823 | 140 | $59 | 500 | 500 |
| CUSTOMER68 | CORP | $9,691 | 68 | $117 | 283 | 373 |
| CUSTOMER60 | CORP | $7,740 | 60 | $126 | 179 | 290 |
| CUSTOMER70 | CORP | $82,400 | 70 | $93 | 300 | 300 |
| CUSTOMER | EDU | $17,570 | | | 163 | 213 |
| CUSTOMER150 | EDU | $6,276 | 150 | $37 | 216 | 216 |
| CUSTOMER95 | EDU | $3,443 | 95 | $47 | 200 | 200 |
| CUSTOMER100 | EDU | $97,765 | 100 | $38 | 0 | 200 |
| CUSTOMER80 | EDU | $1,895  520 | 80 | $47 | 200 | 200 |
| CUSTOMER111 | EDU | $67,164 | 111 | $32 | 155 | 165 |
| CUSTOMER50 | GOV | $7,278 | 50 | $67 | 0 | 0 |
| CUSTOMER81 | GOV | $5,954 | 50 | $40 | 130 | 132 |
| CUSTOMER33 | EDU | $90,366 | 50 | $87 | 89 | 117 |
| CUSTOMER90 | GOV | $3,492 | 50 | $32 | 107 | 127 |
| CUSTOMER50 | EDU | $83,088 | 39 | $56 | 126 | 126 |
| CUSTOMER50 | GOV | $55,883 | 35 | $56 | 125 | 125 |
| CUSTOMER50 | GOV | $8,518 | 80 | $55 | 121 | 121 |
| CUSTOMER50 | CORP | $1,057 | 60 | $55 | 120 | 120 |
| CUSTOMER39 | CORP | $9,154 | 63 | $40 | 120 | 120 |

Callout (530) near CUSTOMER50 GOV $7,278 row:
WAS: $7,279
BY: MARISSA DULANEY
8/13/08 AT 10:00 AM
UNDO CHANGE Callout (515/535) near CUMULATIVE2 column:
WAS: 13
BY: PAUL ANASTASOPOULOS
8/13/08 AT 10:00 AM
UNDO CHANGE

FIG. 6

| CUSTOMER | TYPE | CUMULATIVE | UNITS | ASP | NUM | CUMULATIVE2 |
|---|---|---|---|---|---|---|
| CUSTOMER500 | EDU | $42,726 | 500 | $32 | 10 | 510 |
| CUSTOMER140 | GOV | $1,823 | 140 | $59 | 500 | 500 |
| CUSTOMER68 | CORP | $9,691 | 68 | $117 | 283 | 373 |
| CUSTOMER60 | CORP | $7,740 | 60 | $126 | 179 | 290 |
| CUSTOMER70 | CORP | $82,400 | 70 | $93 | 300 | 300 |
| CUSTOMER | EDU | $17,570 | | | 163 | 213 |
| CUSTOMER150 | EDU | $6,276 | 150 | $37 | 216 | 216 |
| CUSTOMER95 | EDU | $3,443 | 95 | $47 | 200 | 200 |
| CUSTOMER100 | EDU | $97,765 | 100 | $38 | 0 | 200 |
| CUSTOMER80 | EDU | $1,895  630 | 80 | $47 | 200 | 200 |
| CUSTOMER111 | EDU  625 | $67,164 | 111 | 635  $32 | 625  155 | 640  625  165 |
| CUSTOMER50 | GOV | $7,278 | 50 | $67 | 0 | 0 |
| CUSTOMER81 | | | | | | |
| CUSTOMER33 | 610 | $5,954 | 50 | $55 | 130 | 132 |
| CUSTOMER90 | CORP | $90,366  615 | 50 | $55 | 89 | 620  117 |
| CUSTOMER50 | CORP | $3,492 | 50 | $55 | 107 | 127 |
| CUSTOMER50 | CORP | $83,088 | 39 | $70 | 126 | 126 |
| CUSTOMER39 | CORP | $55,883 | 35 | $72 | 125 | 125 |
| CUSTOMER35 | EDU | $8,518 | 80 | $31 | 121 | 121 |
| CUSTOMER80 | EDU | $1,057 | 60 | $40 | 120 | 120 |
| CUSTOMER60 | EDU | $9,154 | 63 | $40 | 120 | 120 |

WAS: $7,279
BY: MARISSA DULANEY
8/13/08 AT 10:00 AM
UNDO CHANGE

WAS: $70
BY: MALINALI SRIVANSTIVA
8/13/08 AT 10:00 AM
UNDO CHANGE

WAS: 13
BY: PAUL ANASTASOPOULOS
8/13/08 AT 10:00 AM
UNDO CHANGE

FIG. 7

| CUSTOMER | TYPE | CUMULATIVE | UNITS | ASP | NUM | CUMULATIVE2 |
|---|---|---|---|---|---|---|
| CUSTOMER500 | EDU | $42,726 | 500 | $32 | 10 | 510 |
| CUSTOMER140 | GOV | $1,823 | 140 | $59 | 500 | 500 |
| CUSTOMER68 | CORP | $9,691 | 68 | $117 | 283 | 373 |
| CUSTOMER60 | CORP | $7,740 | 60 | $126 | 179 | 290 |
| CUSTOMER70 | CORP | $82,400 | 70 | $93 | 300 | 300 |
| CUSTOMER | EDU | $17,570 | | | 163 | 213 |
| CUSTOMER150 | EDU | $6,276 | 150 | $37 | 216 | 216 |
| CUSTOMER95 | EDU | $3,443 | 95 | $47 | 200 | 200 |
| CUSTOMER100 | EDU | $97,765 | 100 | $38 | 0 | 200 |
| CUSTOMER80 | EDU | $1,895  750  730  80 | | $47 | 200 | 200 |
| CUSTOMER111 | EDU  745 | $67,164 | 111 | $32 | 155 | 165 |
| CUSTOMER50 | GOV | $7,278 | 50 | $67 | 0 | 0 |

WAS: EDU
BY: MARISSA DULANEY
8/13/08 AT 10:00 AM
UNDO CHANGE — 720

WAS: 124
BY: MALINALI SRIVANSTIVA
8/13/08 AT 10:00 AM
UNDO CHANGE — 710

735 — 725 - 740
705

WAS: 13
BY: PAUL ANASTASOPOULOS
8/13/08 AT 10:00 AM
UNDO CHANGE

715

| CUSTOMER50 | GOV | $5,954 | 50 | $55 | 130 | 132 |
| CUSTOMER50 | CORP | $90,366 | 50 | $55 | 89 | 117 |
| CUSTOMER50 | CORP | $3,492 | 50 | $55 | 107 | 127 |
| CUSTOMER39 | CORP | $83,088 | 39 | $70 | 126 | 126 |
| CUSTOMER35 | CORP | $55,883 | 35 | $72 | 125 | 125 |
| CUSTOMER80 | EDU | $8,518 | 80 | $31 | 121 | 121 |
| CUSTOMER60 | EDU | $1,057 | 60 | $40 | 120 | 120 |
| CUSTOMER63 | EDU | $9,154 | 63 | $40 | 120 | 120 |

| CUSTOMER | TYPE | CUMULATIVE | UNITS | ASP | NUM | CUMULATIVE2 |
|---|---|---|---|---|---|---|
| CUSTOMER500 | EDU | $42,726 | 500 | $32 | 10 | 510 |
| CUSTOMER140 | GOV | $1,823 | 140 | $59 | 500 | 500 |
| CUSTOMER68 | CORP | $9,691 | 68 | $117 | 283 | 373 |
| CUSTOMER60 | CORP | $7,740 | 60 | $126 | 179 | 290 |
| CUSTOMER70 | CORP | $82,400 | 70 | $93 | 300 | 300 |
| CUSTOMER | EDU | $17,570 | | | 163 | 213 |
| CUSTOMER150 | EDU | $6,276 | 150 | $37 | 216 | 216 |
| CUSTOMER95 | EDU | $3,443 | 95 | $47 | 200 | 200 |
| CUSTOMER100 | EDU | $97,765 | 100 | $38 | 0 | 200 |
| CUSTOMER80 | EDU | $1,895 | 80 | $47 | 200 | 200 |
| CUSTOMER111 | EDU | $67,164 | 111 | $32 | 155 | 165 |
| CUSTOMER50 | GOV | $7,278 | 50 | $67 | 0 | 0 |
| CUSTOMER81 | CORP | $1,844 | 50 | $124 | 13 | 120 |
| CUSTOMER33 | CORP | $2,329 | 50 | $55 | 130 | 150 |
| CUSTOMER90 | CORP | $7,844 | 50 | $55 | 130 | 140 |
| CUSTOMER50 | GOV | $71,605 | 50 | $55 | 130 | 140 |
| CUSTOMER50 | GOV | $262 | 50 | $55 | 89 | 139 |
| CUSTOMER50 | GOV | $5,954 | 50 | $55 | 89 | 132 |
| CUSTOMER50 | CORP | $90,366 | 50 | $55 | 107 | 117 |
| CUSTOMER50 | CORP | $3,492 | 50 | $70 | 126 | 127 |
| CUSTOMER39 | CORP | $83,088 | 39 | $72 | 125 | 126 |
| CUSTOMER35 | CORP | $55,883 | 35 | $31 | 121 | 125 |
| CUSTOMER80 | EDU | $8,518 | 80 | $40 | 120 | 121 |
| CUSTOMER60 | EDU | $1,057 | 60 | $40 | 120 | 120 |
| CUSTOMER63 | EDU | $9,154 | 63 | | 120 | 120 |

FIG. 9

| ISSUE TYPE | SUMMARY | ASSIGNEE | | | |
|---|---|---|---|---|---|
| NEW FEATURE | SPECIAL BENEFITS FOR @ADOBE.COM | MIKE DE LAUREN | ☐ | CRITICAL | OPEN | |
| CHANGE REQUEST | RE: I'D LIKE TO PUT IN A CAB REQUEST TO PUSH A NEW BUILD OF ETS SERVER | ED ADASIAK | ☐ | CRITICAL | OPEN | UNRESOLVED |
| NEW FEATURE | SAP/CRM INTEGRATION | SANDY PRATT | ☐ | MINOR | OPEN | UNRESOLVED |
| NEW FEATURE | RENGA: SUPPORT FLASH PLAYER 10 | MARISSA DULANEY | ☐ | MAJOR | OPEN | UNRESOLVED |
| NEW FEATURE | LOG INTO ANY CONNECTNOW MEETING FROM THE LANDING PAGE | KAREN TOMLINSON | ☐ | CRITICAL | OPEN | UNRESOLVED |
| CHANGE REQUEST | | | ☐ | | | |
| NEW FEATURE | NEW METIC VIEW: NEW ACCOUNTS BY COUNTRY | LON SMITH | ☐ | CRITICAL | OPEN | UNRESOLVED |
| CHANGE REQUEST | CAB REQUEST: CREATE NEW RENGA MESSAGING INSTANCE & UPDATE ETS MESSAGING | ED ADASIAK | ☐ | CRITICAL | OPEN | UNRESOLVED |
| CHANGE REQUEST | LANDING PAGE: PERFORMANCE IMPROVEMENTS (WAS "DECREASE LOAD TIME") | MIKE DE LAURENTIS | ☐ | MAJOR | OPEN | UNRESOLVED |
| CHANGE REQUEST | LANDING PAGE SUPPORTS DISPLAYING MARKETING MESSAGE DYNAMICALLY BASED ON RULES | KAREN WOODMANSEE | ☐ | CRITICAL | OPEN | UNRESOLVED |
| TASK | ACCESS TO DYLAN JMS ENDPOINT FROM OPSOURCE ACROBAT.COM ZONE | EDDIE BERNARD | | CRITICAL | IN PROGRESS | UNRESOLVED |
| NEW FEATURE | REAL-TIME USER CHANGE EVENTS (AKA RENGA MESSAGING) | SANDY PRATT | WAS: OPEN<br>BY: MARISSA DULANEY 8/13/08 AT 10:00 AM<br><br>UNDO CHANGE | | | |
| NEW FEATURE | PERFORMANCE DASHBOARD/REPORT FOR LANDING PAGE | SARA MITCHELL | | | | |
| NEW FEATURE | METRICS - PURCHASE | LON SMITH | | | | |
| DEVELOPMENT SUB TASK | "RGA -121 | | | | | |
| IMPLEMENT UAS MANAGEMENT OF EMPLOYEE ADOBE IDs" | ERIC THOMPSON | FANG CHANG | ☐ | OPEN | UNRESOLVED | 8/7/2008 |
| NEW FEATURE | BUSINESS INTELLIGENCE BETA | MIKE DE LAURENTIS | ☐ | MAJOR | OPEN | UNRESOLVED |
| NEW FEATURE | SELF-SERVICE ACCOUNT CANCELLATION (FREE ACCOUNTS) | MIKE DE LAURENTIS | ☐ | MAJOR | OPEN | UNRESOLVED |
| TASK | ACROBAT.COM@ ADOBE PHASE 1 SECURITY REQUIREMENTS | JOHN TRAMMEL | ☐ | MAJOR | OPEN | UNRESOLVED |
| NEW FEATURE | UPDATE LANDING PAGE FOR eCOMMERCE NEEDS | MANGESH BHANDARKAR | ☐ | CRITICAL | OPEN | UNRESOLVED |
| NEW FEATURE | IMPLEMENT ETHNIO TO ENABLE SURVEYS ON-DEMAND W/O | MIKE DE LAURENTIS | ☐ | CRITICAL | OPEN | UNRESOLVED |

| ACTIVITY | OWNER | LOCATION | | START | FINISH |
|---|---|---|---|---|---|
| WAKE UP | PAUL McCARTNEY | | | | 3 |
| GET OUT OF BED | PAUL McCARTNEY | | | | 0 |
| THINK ABOUT DREAMS | RINGO STARR | | | | 3 |
| DRAG COMB ACROSS HEAD | RINGO STARR | | | | 0 |
| GO DOWNSTAIRS | PAUL McCARTNEY | | | | 6 |
| DRINK A CUP | JOHN LENNON | KITCHEN | | 40:01 | 40:01 |
| LOOK UP | JOHN LENNON | | | | |
| CHECK THE TIME | GEORGE MARTIN | | | 30:05 | 30:05 |
| FIND COAT | PAUL McCARTNEY | | | 12:32 | 12:32 |
| GRAB HAT | PAUL McCARTNEY | WORK | | 10:09 | 10:09 |
| CATCH THE BUS | JOHN LENNON | WORK | | | |
| GO UPSTAIRS | RINGO STARR | WORK | | 30:05 | 30:05 |
| HAVE A SMOKE | JOHN LENNON | WORK | | 12:32 | 12:32 |
| SPEAK | GEORGE HARRISON | WORK | | 10:09 | 10:09 |
| FALL INTO A DREAM | PAUL McCARTNEY | BEDROOM | | 26:18 | 26:18 |
| NOTICE THAT THE LIGHTS HAVE CHANGED | GEORGE MARTIN | BEDROOM | | 4:01 | 4:01 |

Callout 1010 — CHANGES: JOSH FLEETWOOD 5/15/08 AT 1:25 PM WAS: DRINK A CUP / WASH A CUP Callout 1020 — CHANGES: JOSH FLEETWOOD 5/15/08 AT 1:25 PM WAS: KITCHEN / BATHROOM Callout 1030 — CHANGES: JOSH FLEETWOOD 5/15/08 AT 1:25 PM WAS: ☐ / ☑

Callout 1040 — CHANGES: JOSH FLEETWOOD 5/15/08 AT 1:25 PM WAS: 40:01 / 39:59

Callout 1050 — CHANGES: JOSH FLEETWOOD 5/15/08 AT 1:25 PM WAS: 40:01 / 39:59

METHOD AND SYSTEM FOR LAYOUT OF ANNOTATION DATA

BACKGROUND

In many fields of endeavour, data is displayed in bubbles or other data containers in conjunction with other electronic content. Often, the data displayed in bubbles is associated with the other electronic content being displayed, such as a cell in a spreadsheet, an image or portion of an image, a word or set of words, or some other target within the electronic content. In some situations, bubbles or other data containers can overlap.

BRIEF DESCRIPTION OF DRAWINGS

Some embodiments are illustrated by way of example, and not limitation, in the figures of the accompanying drawings, in which:

FIG. 1 illustrates a user interface including overlapping data containers associated with target items on a spreadsheet;

FIG. 2 further illustrates a user interface including overlapping data containers associated with target items on a spreadsheet;

FIG. 6 illustrates a user interface including non-overlapping data containers associated with target items on a spreadsheet, according to various embodiments;

FIG. 7 illustrates a user interface including non-overlapping data containers associated with target items on a spreadsheet that have been shifted and resized, according to various embodiments;

FIG. 8 illustrates a user interface including non-overlapping data containers associated with target items on a spreadsheet and a pointer of fixed length that has been shifted, according to various embodiments;

FIG. 9 illustrates a user interface including non-overlapping data containers associated with target items on a spreadsheet that have been resized, according to various embodiments;

FIG. 10 illustrates a user interface including a data container that has been shifted to fit within the viewable area, according to various embodiments;

FIG. 11 illustrates a user interface including data containers in an alternating format, according to various embodiments.

DETAILED DESCRIPTION

Figure 3:
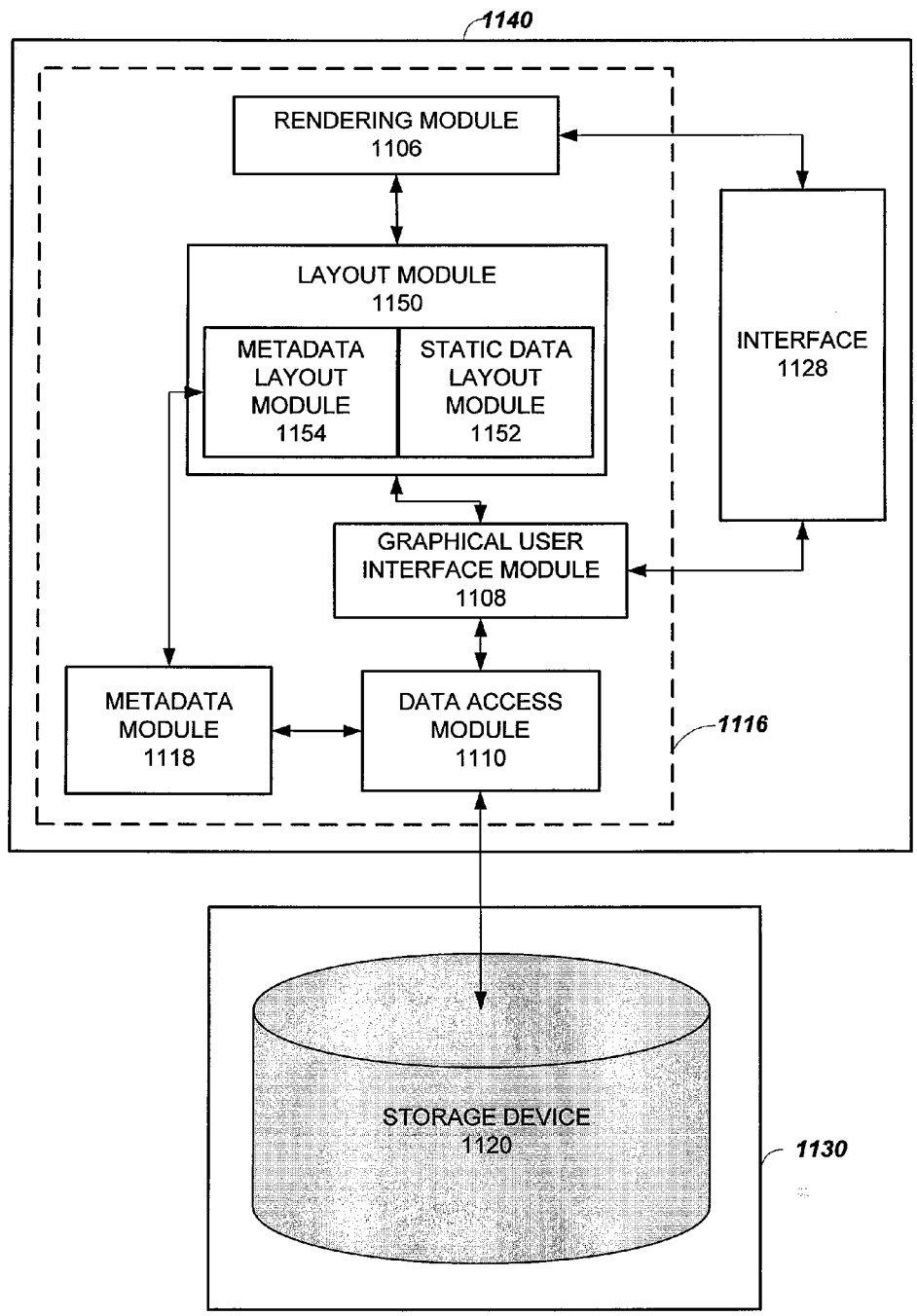
FIG. 3 is a block diagram of a system to layout annotation data, according to various embodiments.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

For the purposes of this specification, the term "data container" or "display container" can be any visual element that contains data. For example, a data container can be a bubble, a box, a cloud, a triangle, or any other visually discernable or defined area containing data. The data container, however, does not need to have visible boundaries (i.e., a data container in the form of a box does not need to have its boundaries visible as lines). These boundaries may be shifted, moved, repositioned, re-arranged, or resized. For example, the data containers may be movable data containers that can be shifted, moved, repositioned, or resized and in doing so, the boundaries of that data container may also be repositioned. In one embodiment, when a rectangular data container with four boundaries is shifted, all four of its boundaries are shifted. When a rectangular data container with four boundaries is resized, one or more of its boundaries may be shifted, and other boundaries may be resized.

The data within the data containers may be metadata that is associated with a target or subject item in some way or annotation data of some sort. The data within the data containers may be in the form of text, such as a description, comment, or a tracked change, a link, a picture, data in any other form, or a combination of different types of data.

The data container may be further associated with, refer to, or related to a target item or fixed data of some electronic content (e.g., digital content). This association may be represented by an association indicium. In one embodiment, the association is depicted by a pointer of fixed size and shape.

It is to be appreciated that electronic or digital content may be any displayable content that can be stored in digital form. For example, electronic content may be in the form of a text document, an ADOBE® Portable Document Format (PDF) document, an image file, a video, or any other displayable digital content.

A "target item" or "subject item" can be any electronic content element that may be presented to a user and is associated with a data container. A target item may be any fixed data in digital content. In some example embodiments, the target item may be in the form of a pixel or set of pixels on a display or file being displayed, a cell or value in a spreadsheet, a part of a picture, a word or set of words in a text document, an item on a webpage, an image displayed in a video, or any other displayable object that is definable and can be associated with a data container. These target items can be discerned from a characteristic of the content element itself (e.g., a paragraph of an electronic document, a cell of a spreadsheet, or a database record or field) or may be manually defined by a user (e.g., a user-selected portion of an electronic document or a user-selected portion of a digital image). In one example embodiment, the target items are static target items that are not moved or altered during the data container arrangement methods described herein.

When more than one data container, such as a bubble, is shown on a display, there is a possibility that these data containers will overlap. When data containers overlap, some of the information or data displayed inside the data container may be obscured from view. Overlapping containers also make the display appear less organized and more difficult to view. An example embodiment seeks to prevent the overlap of data containers and, therefore, also to prevent the obscuring of data contained in the information or data contained in the data containers from view by resizing the data containers, shifting the data containers, shifting the pointers associated with the data containers or a combination the above. This mechanism can lead to more data being accessible in a more organized and efficient manner.

Options when displaying data containers are to allow such data containers to overlap or, where comments were arranged in a non-overlapping layout, to visually connect the underlying target associated with the data container with a variable length connector (often in the form of a line or arrow). However, with such layout options, some data containers will still be obscured, or alternatively, data containers will not be conveniently located near the targeted data. This may also cause confusion as to which data container is associated with which targeted item, especially when the lines or arrows cross in such a way that the angle between them cause a viewer difficulty in determining which line goes where.

In an example embodiment described herein, each data container or display container is associated with a target item and a pointer of fixed size and shape. These pointers of fixed size and their associated data containers are initially arranged such that the pointers and their associated data containers are connected and the pointers point to the target items to which each pointer and its associated data container is associated. If the data containers are arranged in a layout such that they will overlap when displayed, the data containers can be resized or shifted in such a way that they will no longer overlap. After the data containers are shifted, the pointers may no longer be connected to the data containers. If such is the case, the pointer of fixed size and shape may also be shifted so that it again connects to the data containers or the data container can be resized again so that it connects to the pointer of fixed size.

FIG. 1 illustrates a user interface displaying electronic content in the form of a spreadsheet 100 having various labels, values, and data. These labels, values, and other data can be changed, commented on, or associated with a data in a data container in some other way. Target items are cells 150 and 160 containing data. In another embodiment, the target items may be the data itself, which are contained in the cells. Movable data containers 110 and 120 contain data associated with target item cells 150 and 160 respectively. These associations are shown by pointers of fixed length 130 and 140 which, in this embodiment, are in the shape of triangles of a fixed size and orientation. In the embodiment illustrated in FIG. 1, the data in the data containers reflects changes made by the user to data in the cells 150 and 160. More specifically, the data containers 110 and 120 display the change that was made on one line; the user who made the change, the date the change was made, and the time the change was made on another line; and an option to undo the change on a third line. However, data contained in the data containers can be of any kind. For example, in another example embodiment, the data in the data containers may correspond to comments made by a user or detailed information about the data containers. In other embodiments, the option to undo the change shown in FIG. 1 can be a link, button, or other user interface element that can perform a desired action.

In the embodiment illustrated by FIG. 1, the data containers 110 and 120 are displayed in a predefined linear zone below their associated target items and are shown initially to overlap. More specifically, the movable data container 120 is shown on top of the data container 110 and obscures some of the data contained in the data container 110. However, in other embodiments, the data containers are not displayed in predefined linear zones. In one example, the target items may be faces of subjects in an image or other portions of an image. In this example, the data containers may not be arranged in a predefined linear zone.

In one embodiment, the pointers of fixed length are initially, or by default, aligned in the same manner as their associated target items. For example, in FIG. 1, a spreadsheet cell 150 is left aligned. Therefore, the pointer 130 associated with target item cell 150 is also left aligned. The pointer 140, on the other hand, is right aligned because its associated target item cell 160 is right aligned. This alignment scheme ensures that the pointer is not pointing to white space in the spreadsheet cell. In alternative embodiments, the pointers may initially be center aligned, left aligned, right aligned, or point at some location within the target item.

In another example embodiment of the invention, the pointers are initially, or by default, visually joined or attached to the top left of the data containers. For example, in FIG. 1, both pointers 130 and 140 are visually joined to the top left of their associated data containers 110 and 120 respectively.

More than one data container can overlap as well. FIG. 2 further illustrates multiple data containers 210 that contain data relating to changes made to the spreadsheet. These data containers 210 overlap with one another on the spreadsheet and cover the data contained in the bottom movable data containers. The data containers 210 are smaller than the data containers 110 and 120 in FIG. 1 and are configured differently, even though they display the same kinds of information. More specifically, the data containers 210 display the change that was made on one line; the user who made the change on another line; the date the change was made and the time the change was made on another line; and an option to undo the change on a fourth line.

By displaying the data in a compact manner, the data containers are capable of being displayed within a smaller space and less likely to overlap with other data containers. To avoid data containers overlapping, large data containers, such as the data containers 110 and 120, can be resized and the data within reorganized to generate smaller data containers such as the data containers 210. There are several ways to arrange the data in a more compact manner and the arrangement may depend in part on the type of data being displayed. For example, text data can be placed on any number of display arrangements. If the data being displayed in a data container is an image, the image can be resized by the same or similar proportions as the data container. In another embodiment, data can be selectively displayed or removed from display in the data container such that only the most pertinent information is displayed.

However, as seen in FIG. 2, even the smaller data containers 210 can potentially still overlap and obscure data. In some embodiments, in addition to resizing the data containers, shifting the data containers and the pointers of fixed length is also done to ensure that the data containers do not overlap.

FIG. 3 is a block diagram of a system 1100, including a computer-based apparatus 1140, according to various embodiments. The system 1100 may include a number of modules such as one or more processors, a rendering module 1106, a graphical user interface (GUI) module 1108, a data access module 1110, a metadata module 1118, and a layout module 1150. The metadata module 1118 may contain several other modules which manage metadata associated with electronic content. For example, the metadata module 1118 may include a comment management module or a change tracking module among other modules. The layout module 1150 may also contain other modules such as a static data layout module 1152 that aids in arranging and laying out static data in the electronic content and a metadata layout module 1154 that aids in arranging metadata associated with the static data in the electronic content. The rendering module 1106, the layout module 1150, and the GUI module 1108 may take the form of an integral module, or exist as separate modules, as shown. These modules may be associated within a machine 1116, such as an apparatus that comprises a personal digital assistant (PDA), a laptop computer, a personal computer, a workstation, or a server, as indicated by their containment within the dashed box.

In order to avoid obscuring the components of FIG. 3, connecting lines between each of the elements within the machine 1116 have not been shown. However, those of ordinary skill in the art will understand that any of the individual elements shown to be located within the confines of the machine 1116 may be operably coupled to any other element within the machine 1116. Similarly, those of ordinary skill in the art will understand that any of the components shown to be located within the confines of the machine 1116 may also be located outside the machine 1116, and appropriately coupled to the machine 1116 via wired or wireless networks or other interface mechanisms.

The data access module 1110 may be used by the rendering module 1106, the layout module 1150, the GUI module 1108, and the metadata module 1118 to access one or more storage devices 1120, such as a database, a memory, a disk, or other storage device. The storage device 1120 may serve to contain one or more items of electronic content. In some embodiments, a storage device may also serve to store metadata associated with electronic content. The data access module 1110 may operate to read from and/or write to the electronic content and may provide reading and writing services for the benefit of other system modules, including the GUI 1108, the processor, the rendering module 1106, and the metadata module 1118.

The data access module 1110 may be present in some embodiments, and absent in others. When present, the data access module 1110 may operate as a mediator between the various components of the system 1100 and the electronic content stored in the storage device 1120. For example, the storage device 1120 may be included in a remote server device 1130 or the storage device 1120 may also form part of an apparatus.

The rendering module 1106 may be operably coupled to an interface 1128 for outputting, such as a display screen, printer, or loudspeaker, among others. This interface 1128 may be used for presenting renderings of content elements and metadata.

A GUI module 1108 may be operably connected to the layout module 1150 and the data access module 1110. The rendering module 1106 may comprise a portable document format processing program in some embodiments.

The GUI module 1108 may receive input from input devices 1132 (e.g., a keyboard, a mouse, a trackball, voice recognizer, touch pad, touch screen, etc.), including user input comprising a "File, Save" command to save or publish a comment or a tracked change as part of the electronic content in response to the prompting of a GUI presented by an electronic content reviewing application. Thus, many embodiments may be realized.

For example, a system 1100 to display metadata associated with elements of electronic content may comprise an interface 1128 for outputting in the form of a display, and a storage device 1120 to store electronic content and metadata associated with electronic content.

The system 1100 may include a rendering module 1106 to display electronic content and metadata associated with an element of electronic content. The rendering module may display the metadata in data containers connected to a pointer of fixed length pointing to a target item in the electronic content with which the metadata is associated.

In some embodiments, the system 1100 may comprise a server device 1130 including the storage device 1120, and a client device 1140 to couple to the server device 1130 via a network, the client device 1140 including the display (e.g., as part of the interface 1128).

In some embodiments, the layout module 1150 comprises a word processing document application program. The system 1100 may comprise a processor to execute the word processing application program to display the electronic content as one or more paginated documents, along with the data containers containing data associated to a portion of the one or more documents.

In some embodiments, the layout module 1150 comprises a spreadsheet application program. The system 1100 may comprise a processor to execute the spreadsheet application program to display the electronic content as one or more spreadsheets along with data containers associated to a portion of the one or more spreadsheets. Other embodiments may similarly comprise image viewing and editing programs, audio/visual programs, web browsers, or any other application that involves the display of electronic content.

In some embodiments, a system 1100 comprises an interface 1128, such as a display, a metadata module 1118, a layout module 1150, and a rendering module 1106. The metadata module 1118 can be used to detect and manage a plurality of metadata associated with electronic content or portions of electronic content. The layout module 1150 may comprise a metadata layout module 1154 and a static data layout module 1152 and be used to arrange and lay out the electronic content and metadata to be displayed. The rendering module 1106 can be used to display the electronic content and metadata arranged by the layout module 1150 as part of a GUI on the display.

The system 1100 may comprise a user interface 1128 allowing a user to create metadata, modify it, arrange it, or associate it with a portion of electronic content.

Figure 4:
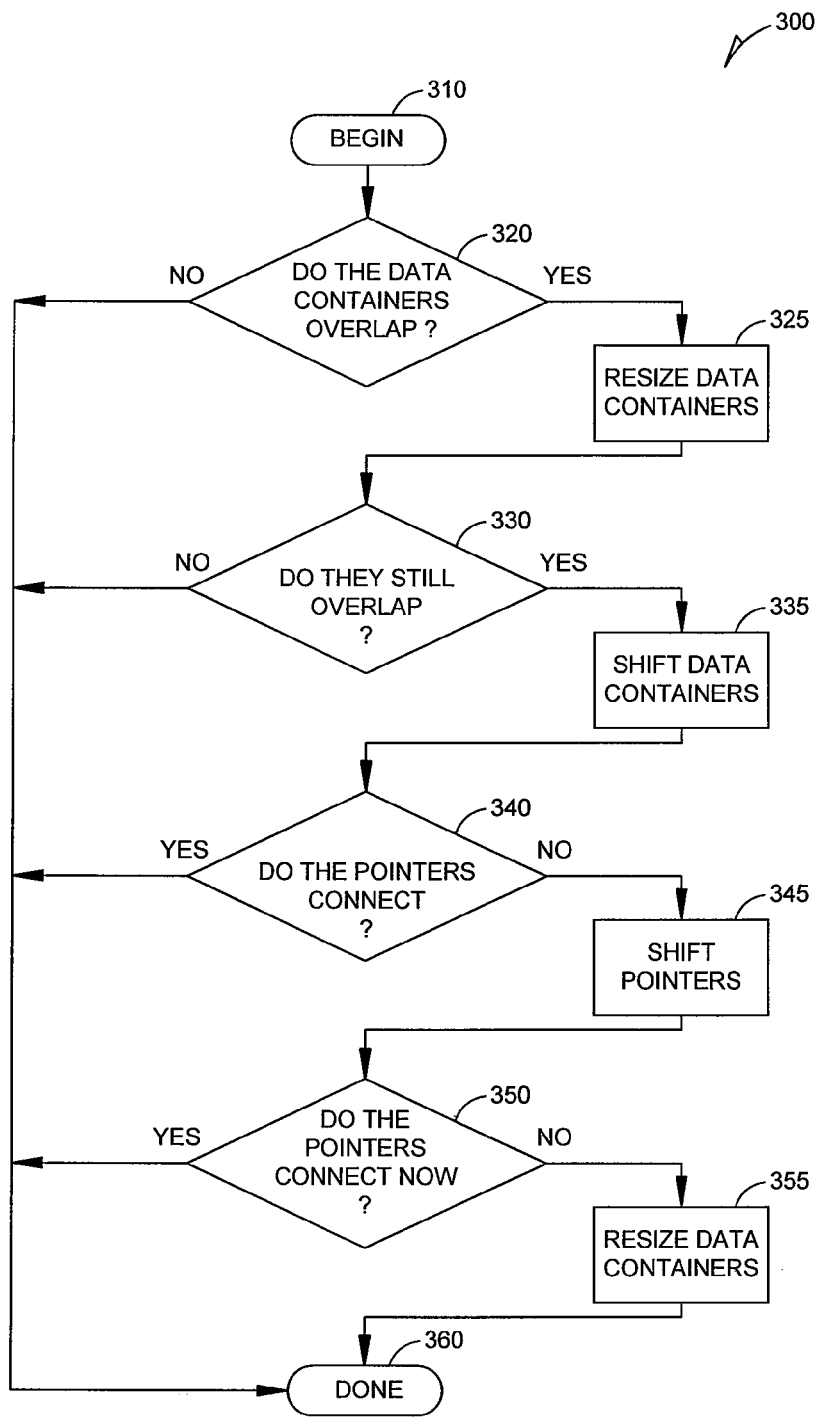
FIG. 4 is a flow diagram illustrating several methods of laying out annotation data, according to various embodiments.

FIG. 4 is a flow diagram illustrating a method 300, according to various embodiments, to avoid data containers overlapping. The method 300 begins at operation 310 with the data containers arranged in an initial arrangement wherein the data containers are a default size, the pointers are connected to the data containers at a default position (e.g., the top left side of the data container), and the pointers are also aligned in a default manner (e.g., in the same manner as its target item as described above).

At operation 320, the metadata layout module 1154 determines whether the data containers overlap or will overlap when displayed. If there is no overlap, there is no need for further action and the method 300 terminates at block 360. However, if there is an overlap, the data containers that are overlapping and overlapped are resized or shrunk at operation 325.

At operation 330, the metadata layout module 1154 determines whether the data containers still overlap or will overlap when displayed or whether the resizing of the data containers was sufficient to prevent the data containers from overlapping. If there is no overlap, there is no need for further action and the method 300 terminates at block 360. If there is an overlap, the data containers are shifted at operation 335 such that they do not overlap. In one embodiment, the shifting is done by placing the data containers in a position such that they do not overlap and then centering the non-overlapping data containers with respect to their target items. During the shifting of the data containers at operation 335, the pointers remain in the same position. Thus, the pointers of fixed size may no longer be connected to the data containers in the initial default position; in fact, the pointers may not be connected to the data containers at all after the operation performed at block 335.

At operation 340, the metadata layout module 1154 determines whether the pointers of fixed size are still connected to the data containers at any position or whether the pointers are no longer connected to the data containers. If the pointers of fixed size are still connected to the data containers, there is no need for further action and the method 300 terminates at block 360. In this scenario, the data containers no longer overlap, they still connect to the pointers at some position, and the pointers still remain unmoved (pointing to their associated target items at their initial position).

It may be confusing to a viewer to see the association between a data container and its associated target item if the pointer pointing to the target item is not connected to the data container. Therefore, if there are pointers that are not connected to their associated data containers, the pointers that are disconnected are shifted toward their associated data containers at operation 345. In one embodiment, the pointer can only be shifted to the extent that it still points to the target item without having to be rotated or altered in size. In a further embodiment, the pointers may be shifted only to the extent necessary to reconnect the pointer to the data container associated with it. In another embodiment, the pointers may be shifted to reconnect each pointer to the data container associated with it in its default position (e.g., the pointer being visually joined to the top left of the data containers as discussed above).

In another embodiment where the pointers are initially aligned in the same manner as their associated target item (e.g., a pointer is left-aligned because it's associated with target item is left-aligned), the pointers may no longer be aligned in the same manner after the shifting of the pointers in operation 345.

At operation 350, the system determines whether, after the pointers have been shifted at operation 345, the pointers now connect to their associated data containers. If the pointers do connect to their associated data containers, the there is no further action and the method is terminated at block 360. In this scenario, the data containers no longer overlap, they still connect to the pointers at some position, and the pointers still point to their associated target items at some position.

If a pointer still does not connect to its associated data container or if a pointer does not point to its associated target item after operation 345, the data containers are again resized at operation 355. Using the method 300, the data containers may be resized in such a way that there will be no overlap between the data containers. In one embodiment where a target item is a cell in a spreadsheet and data containers are displayed in a row as opposed to a column, this is achieved by shrinking the data containers such that the width of the data container is less than or equal to the width of the cell. If the data containers are to be displayed vertically in a column, the same result can be achieved by shrinking the data containers such that the height of the data container is less than or equal to the height of the cell. Once the data containers are resized such that they do not overlap, their associated pointers are connected, and their associated pointers point to their associated target items, the method 300 terminates at operation 360.

In other embodiments, the method 300 can continue beyond operation 355. For example, the method 300 can continue in an iterative manner where operations 325 to 350 repeat until data containers do not overlap, their associated pointers are connected, and their associated pointers point to their target items. In one example embodiment, there are no predefined sizes of data containers and the size of the data containers and the resized data containers are determined dynamically. In another embodiment, there can be predefined sizes of data containers such as, for example, a large data container (the default), a small-sized data container, and a mini-sized data container, which may be a size that ensures that there will be no overlap. In other embodiments, there may be any number of predefined sizes for data containers or a mix between a number of predefined sizes for data containers and some sizes that can be determined dynamically. In another embodiment, the size of the data containers is dependent on the size and arrangement of the data shown inside the data container.

In other embodiments, the operations shown in FIG. 3 (the resizing of the data containers in operations 325 and 355, the shifting or repositioning of the data containers in operation 335, and the shifting or moving of the pointers in operation 345) can be executed in any order. For example, in one such embodiment, overlapping data containers are first shifted. If the pointers do not connect with the shifted data containers, the pointers may be shifted. If the pointers still do not connect to the data containers, the data containers may be resized and shrunk, so on and so forth.

In still another embodiment, the data containers may be resized when its associated target item or object associated with the associated target item is resized. For example, where the electronic content being displayed is a spreadsheet, a data container may be resized if the width or height of a target cell is resized or if the column or row containing the target cell is resized; where the electronic content being displayed is an image and the target item is a portion of the image, a data container may be resized if the target portion of the image is enlarged or shrunk in any dimension or if the entire image is enlarged or shrunk in any dimension. The extent and manner that the data container is resized may depend on the extent and manner the associated target item or object associated with the target item is resized. For example, if the cell's height is shrunken by 20 percent, the data container may have its height shrunken by 20 percent; if on the other hand, the cell's width is lengthened by 10 percent, the data container may have its width lengthened by 10 percent.

Figure 5:
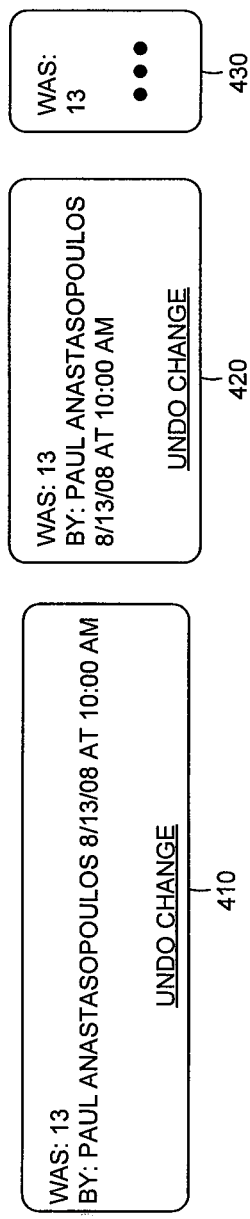
FIG. 5 illustrates data containers of differing sizes according to various embodiments.

FIG. 5 illustrates three differently sized data containers 410, 420, and 430. The three data containers 410, 420, and 430 are shown for illustrative purposes only and may constitute a set of predefined sizes for data containers, a subset of predefined sizes for data containers, three sizes of data containers that were dynamically determined, or a combination thereof. As discussed above, data containers can contain any type of data (e.g., text, images, video links, buttons etc.) or a combination of different types of data. In FIG. 5, data containers 410, 420, and 430 contain text data associated with tracked changes.

The data container 410 is a large data container showing a change that was made on one line and on another line, the person who made the change, and the date and time the change was made. The data container 410 also displays an option to undo the change.

The data container 420 is a smaller data container. In one example embodiment, the data container 410 can be resized to the size of the data container 420 in the method of arranging the data containers such that they do not overlap. In doing so, the data inside the data container 420 may be rearranged. The data container 420 shows the change that was made on one line, the person who made the change on another line, and the date and time the change was made on a third line. Data container 420 also displays an option to undo the change.

The data container 430 is an even smaller data container. In one example embodiment, the data containers 410 or 420 can be resized to the size of the data container 430 in the method of arranging the data containers such that they do not overlap. As illustrated by the data container 430, information may be selectively left out of a resized data container 430 so that the most important data could be shown in a smaller amount of space. More specifically, in the data container 430, only the change that was made on one line and an indication that data was left out, in this case, an ellipsis is shown. In an example embodiment, the indication that data was left out can be a button or a link that when selected will display the full data either in a larger data container, such as the data containers 410 or 420, or in a separate area.

FIG. 6 illustrates a user interface arrangement that is a result of an example method that arranges data containers so that they do not overlap. In this embodiment, the method began with the layout in FIG. 1 in which spreadsheet 100 contains two data containers 110 and 120. These data containers 110 and 120 may be a default size, with the pointers connecting to the data containers at a default position (e.g., top left side of the data container), and the pointers pointing to the target item and, by default, aligned in the same manner as the target item (e.g., left-aligned for a left-aligned target item). However, this is not necessary for the method to succeed. The system determines that the data containers 110 and 120 overlap. In response to this determination, the system resizes the data containers, shrinking them a determinable amount. This amount can be a predefined amount or determined dynamically. The result of the resizing can be seen in the data containers 510 and 515 in FIG. 6, which correspond to the data containers 110 and 120 respectively. The pointers 530 and 535 have not been moved and still point to their respective target items 520 and 525. After data containers 510 and 515 have been resized, the system then determines whether the shrunken data containers still overlap. In FIG. 6, data containers 510 and 515 no longer overlap and so no further action needs to be taken by the system.

FIG. 7 illustrates another user interface arrangement that is the result of an example method that arranges data containers so that they do not overlap. In this embodiment, the method begins with a spreadsheet 100 that contains three data containers. These data containers may be a default size, with the pointers connecting to the data containers at a default position (e.g., top left side of the data container), and the pointers pointing to the target item and, by default, aligned in the same manner as the target item (e.g., left-aligned for a left-aligned target item). However, this is not necessary for the method to succeed. The system determines that the three data containers overlap. In response to this determination, the system resizes the data containers, shrinking them a determinable amount. This amount can be a predefined amount or determined dynamically. The resized data containers 610, 615, and 620 can be seen in FIG. 7. At this point, the pointers 625 have not been moved and are still aligned in the same manner as the target items 630, 635, and 640.

After the data containers 610, 615, and 620 have been resized, the metadata layout module 1154 then determines whether the shrunken data containers still overlap. In this case, after the resizing of the data containers, the data containers still overlap (not shown in FIG. 7). The system then shifts the overlapping data containers 610, 615, and 620 so that they no longer overlap (see FIG. 7, the data containers 610, 615, and 620 are shown after they have been resized and shifted). After the data containers 610, 615, and 620 have been shifted, there is a risk that the pointers 625 that have not been moved will no longer be connected to their associated data containers 610, 615, and 620. The system, therefore, will determine if the pointers 625 still connect. In the case of FIG. 7, the pointers 625 are still connected to their associated data containers so no further action is needed.

FIG. 8 illustrates another user interface arrangement that is the result of an example method that arranges data containers so that they do not overlap. In this embodiment, the system begins with a spreadsheet 100 that contains three data containers. These data containers may be a default size, with the pointers connecting to the data containers at a default position (e.g., top left side of the data container), and the pointers pointing to the target item and, by default, aligned in the same manner as the target item. However, this is not necessary for the method to succeed. The system determines that the three data containers overlap. In response to this determination, the system resizes the data containers, shrinking them a determinable amount. This amount can be a predefined amount or determined dynamically. The resized data containers 705, 710, and 715 can be seen in FIG. 8. At this point, the pointers 720, 725, and the pointer associated with data container 715 have not been moved and are still aligned in the same manner as target items 735, 740, and 745 respectively.

In FIG. 8, for the sake of clarity, pointer 750 is shown to represents the initial position of the pointer associated with data container 715 and pointer 730 represents the same pointer after it is shifted in subsequent operations discussed below. As such, pointer 750 will not be displayed in the displayed result.

After the data containers 705, 710, and 715 have been resized, the system then determines whether the shrunken data containers still overlap. In this case, after the resizing of the data containers, the data containers still overlap (not shown in FIG. 8). The system then shifts the overlapping data containers 705, 710, and 715 so that they no longer overlap (see FIG. 8, the data containers 705, 710, and 715 are shown after they have been resized and shifted).

After the data containers 705, 710, and 715 have been shifted, there is a possibility that the pointers 720, 725, and 750 that have not been moved will no longer be connected to their associated data containers 705, 710, and 715. The system, therefore, will determine if the pointers 720, 725, and 750 still connect to their associated data containers. In the instant example, at this point in the method, pointer 750 is no longer connected to its associated data container 715. Pointer 750 is not connected to data container 715 because the pointer was initially left aligned in the same manner as its associated target item 745 and the shifted data container 715 is no longer directly under the left side of target item 745.

Once the disconnect of pointer 750 and its data container 715 is detected, the pointer 750 is shifted to try to reconnect data container 715 to its associated pointer. With regards to FIG. 8, this means that the pointer in its initial position 750 is shifted to its position shown by pointer 730. If the disconnected pointer can be shifted to connect to its associated data container, the method is complete and no further action is required.

FIG. 9 illustrates another user interface arrangement that is the result of an example method that arranges data containers so that they do not overlap. In this embodiment, the method began with a spreadsheet that contained four data containers. These data containers may be a default size, with the pointers connecting to the data containers at a default position (e.g., top left side of the data container), and the pointers pointing to the target item and, by default, aligned in the same manner as the target item. However, this is not necessary for the method to succeed. The metadata layout module 1154 determined that the four data containers overlap. In response to this determination, the layout module may shift the data containers and the pointers if necessary, resize the data containers a determinable amount, or some combination of shifting and resizing the data containers as discussed above. The extent of the amount a data container is resized can be a predefined amount or determined dynamically. The process of resizing the data containers can be gradual, involving several resizing and shifting operations. Furthermore, these operations can be part of an iterative process. Alternatively, the resizing process can be a single resizing operation, resizing the data containers to a size that is guaranteed not to overlap.

FIG. 9 illustrates one result of such arranging methods. The data containers 805, 810, 815, and 820 have each been resized to have a width corresponding to the width of the target item that the data container is associated with. For example, the data container 805 is the width of the target cell 845, and in the same way, the data containers 810, 815, and 820 are of the same width as the target cells 850, 855, and 860 respectively. Where the electronic content is in the form of a spreadsheet, resizing the data containers to be the width of the target item cell or the column to which the target item cell belongs is one way to achieve no overlap with other data containers associated with target item cells on the same row. In a similar manner, the data containers can be resized to be the height of the target item cells if data containers are to be displayed in a vertical arrangement. The pointers 825, 830, 835, and 840 still point to their respective target cells 845, 850, 855, and 860 and are aligned in the same manner as their target items.

An example method may include shifting a data container that is not arranged to be displayed entirely on the viewable area of the electronic content or graphical user interface so that it fits on the viewable area of the electronic content or graphical user interface. For example, in FIG. 10, the data container 910 has been shifted left so that it fits entirely within the viewable area. This can be an initial operation in the process or an operation that is repeated after every resizing or shifting of data containers. Furthermore, the edges of the viewable area of the electronic content or graphical user interface may be used as a border in the resizing or shifting of data containers operations of the method such that data containers will not be allowed to shift or resize so that part of the data containers is not in the viewable area of the electronic content or graphical user interface.

In another embodiment, if the data containers would be cut off by the bottom of the viewable area of the electronic content or graphical user interface, the data containers may be moved and displayed above the target item instead of below it. In this configuration, pointers are visually joined or attached to the bottom of a data container.

In still another embodiment, data containers may be displayed both on top and on bottom of the target items. The data containers may be displayed in an alternating pattern. For example, in FIG. 11, data containers 1010, 1020, 1030, 1040, and 1050 alternate being displayed on the bottom and top. However, even with the alternating arrangement, there may still be a need to resize and shift the data containers and shift the data containers because, as seen in FIG. 11, they may still overlap.

It should be noted that the methods described herein do not have to be executed in the order described, or in any particular order. Moreover, various activities described with respect to the methods identified herein can be executed in iterative, repetitive, serial, or parallel fashion. Activities within various methods may also be combined, to include combination across the various figures used herein.

It should also be noted that in every case where the activity of displaying or rendering is denoted, information may be communicated (e.g., transmitted and received) between a variety of entities to enable such display or rendering activity. For example, a server may transmit information to a receiving entity, such as one or more clients or workstations, to enable displaying or rendering the various visual elements described.

Figure 12:
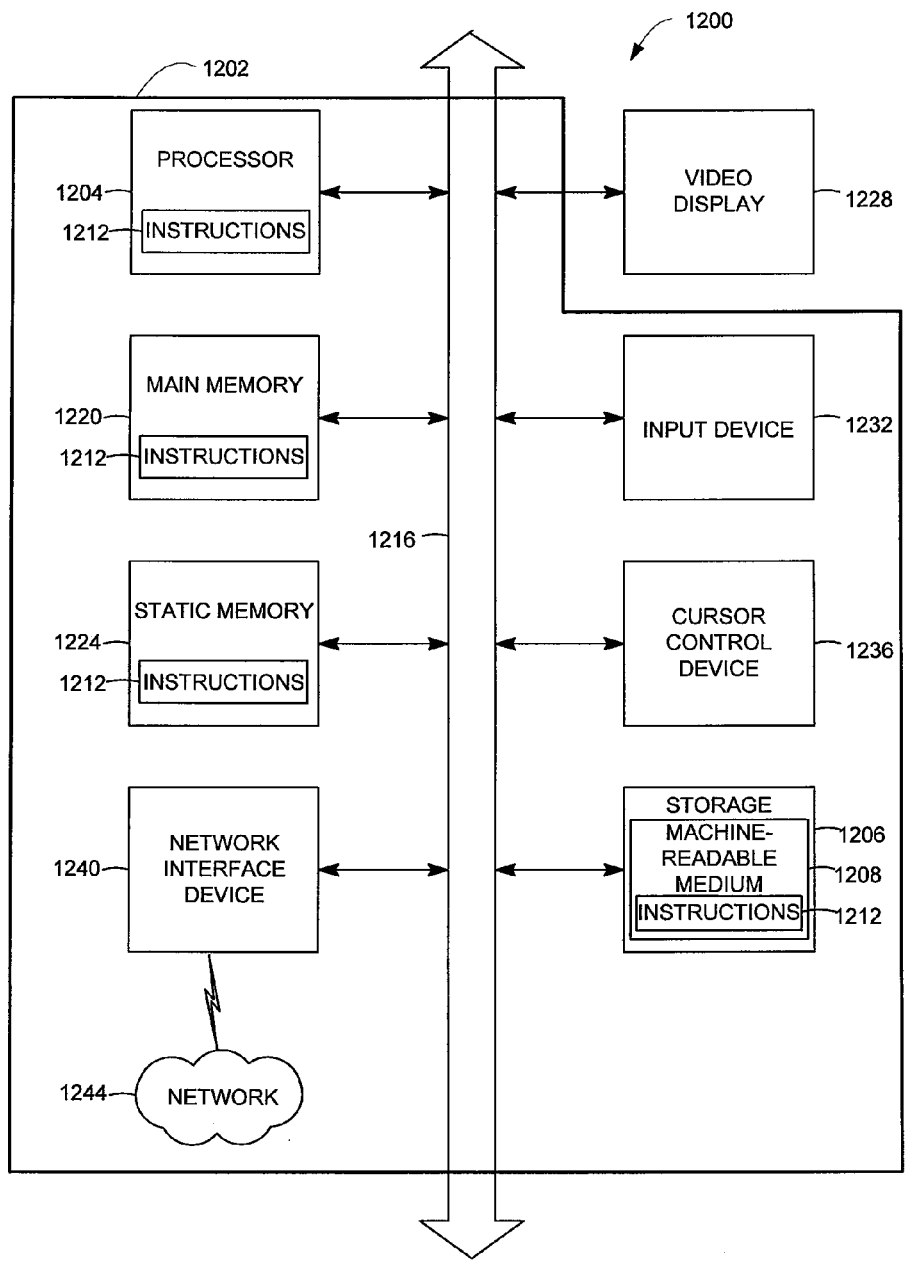
FIG. 12 is a block diagram of an article of manufacture, including a machine, according to various embodiments.

FIG. 12 is a block diagram of an article 1200 of manufacture, including a machine 1202, according to various embodiments. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment.

Thus, other embodiments may be realized. For example, an article 1200 of manufacture, such as a computer, a memory system, a magnetic or optical disk, some other storage device, and/or any type of electronic device or system may include one or more processors 1204 coupled to a machine-readable medium 1208 such as a memory (e.g., removable storage media, as well as any memory including an electrical, optical, or electromagnetic conductor) having instructions 1212 stored thereon (e.g., computer program instructions), which when executed by the one or more processors 1204 result in the machine 1202 performing any of the actions described with respect to the methods above.

The machine 1202 may take the form of a computer system having a processor 1204 coupled to a number of components directly, and/or using a bus 1216. Thus, the machine 1202 may be similar to or identical to the system 1100, the machine 1116, or the apparatus 1140 shown in FIG. 3.

Turning now to FIG. 12, it can be seen that the components of the machine 1202 may include main memory 1220, static or non-volatile memory 1224, and mass storage device 1206. Other components coupled to the processor 1204 may include an output device 1228, such as a video display, an input device 1232, such as a keyboard, and a cursor control device 1236, such as a mouse. A network interface device 1240 to couple the processor 1204 and other components to a network 1244 may also be coupled to the bus 1216. The instructions 1212 may further be transmitted or received over the network 1244 via the network interface device 1240 utilizing any one of a number of well-known transfer protocols (e.g., the HyperText Transfer Protocol). Any of these elements coupled to the bus 1216 may be absent, present singly, or present in plural numbers, depending on the specific embodiment to be realized.

The processor 1204, the memories 1220, 1224, and the storage device 1206 may each include instructions 1212 which, when executed, cause the machine 1202 to perform any one or more of the methods described herein. For example, some embodiments may comprise a machine-readable medium having instructions stored therein for causing a machine to implement a method that comprises any of the activities described and shown with respect to FIG. 4.

In some embodiments, the machine 1202 operates as a standalone device or may be connected (e.g., networked) to other machines. In a networked environment, the machine 1202 may operate in the capacity of a server or a client machine in server-client network environment, or as a peer machine in a peer-to-peer (or distributed) network environment. The machine 1202 may comprise a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 1202 is illustrated, the term "machine" shall also be taken to include any collection of machines that individually or jointly execute a set (or multiple sets) of instructions to perform any one or more of the methodologies discussed herein.

While the machine-readable medium 1208 is shown as a single medium, the term "machine-readable medium" should be taken to include a single medium or multiple media (e.g., a centralized or distributed database, and/or associated caches and servers, and or a variety of storage media, such as the processor 1204 registers, memories 1220, 1224, and the storage device 1206) that store the one or more sets of instructions 1212. The term "machine-readable medium" shall also be taken to include any medium that is capable of storing, encoding or carrying a set of instructions for execution by the machine and that cause the machine 1202 to perform any one or more of the methodologies of the embodiments presented herein, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Some portions of the detailed description above are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification, discussions utilizing terms such as "processing," "computing," "calculating," "determining," or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method comprising:
   determining that a first data container and a second data container overlap within a user interface display, the first data container and the second data container visually attached, respectively, to a first pointer and a second pointer, the first pointer being of a fixed size and the second pointer being of the fixed size, the first pointer to visually connect the first data container to a first target item and the second pointer to visually connect the second data container to a second target item, the first pointer and second pointer connecting to the data containers at a default position and pointing to the target item and, by default, aligned in the same manner as the target items, the first target and the second target item being cells in the same row of a spreadsheet, the first and second data container being displayed in one or more predefined linear zones that are positioned so as to cause the first and second data container to be aligned parallel to the row of the spreadsheet that includes the cells;

responsive to the determining and using one or more processors, automatically shifting one or more boundaries of at least one of the first data container or the second data container while maintaining the fixed size of the first and second pointers so that the first data container and the second container do not overlap within the display;

determining that, as a result of the shifting, the first pointer is not visually joined to the first data container;

shifting the first pointer toward the first data container so as to maintain a visual connection with respect to the first pointer; and maintaining an orientation of the first pointer and the second pointers so that the first pointer points to the first target item and the second pointer points to the second target item.

2. The method of claim 1, wherein the shifting one or more boundaries includes performing at least one of the shifting and resizing at least one of the first data container and the second data container.

3. The method of claim 2, wherein the resizing of at least one of the first or second data container further comprises selectively removing data from the first data container or the second container.

4. The method of claim 1, further comprising:
determining, as a result of the shifting, that the first pointer is not visually attached to the first data container; and
resizing at least one of the first or second data containers so that the first pointer is visually attached to the first data container.

5. The method of claim 1, wherein at least one of the first data container or the second data container is resized to a predefined size.

6. The method of claim 1, wherein the first pointer is aligned with text displayed in the first target item.

7. The method of claim 1, further comprising:
determining that the first data container will not be displayed in its entirety within the display; and
shifting the first data container so that the first data container is displayed in its entirety within the display.

8. A system comprising:
one or more processor;
a static data layout module to arrange a placement of a first and second static target items;
a metadata layout module to:
determine that a first data container and a second data container overlap within a user interface display, the first data container and the second data container visually attached, respectively, to a first pointer and a second pointer, the first pointer being of a fixed size and the second pointer being of the fixed size, the first pointer to visually connect the data container to the first static target item and the second pointer to visually connect the second data container to the second static target item, the first pointer and second pointer connecting to the data containers at a default position and pointing to the static target item and, by default, aligned in the same manner as the static target items, the first static target and the second static target item being cells in a same row of a spreadsheet, the first and second data container being displayed in one or more predefined linear zones that are positioned so as to cause the first and second data container to be aligned parallel to the row of the spreadsheet that includes the cells;

based on the determination and using the one or more processors, automatically shift one or more boundaries of at least one of the first data container or the second data container while maintaining the fixed size of the first and second pointers so that the first data container and the second container do not overlap within the user interface;

determine that, as a result of the shift, a first pointer is not visually joined to the first data container;

shift the first pointer toward the first data container so as to maintain a visual connection with respect to the first pointer; and maintain an orientation of the first pointer and second pointers so that the first pointer points to the first static target item and the second pointer points to the second static target item.

9. The system of claim 8, wherein the metadata layout module is further to resize at least one of the first data container and the second data container.

10. The system of claim 8, wherein the metadata layout module is to:
determine, as a result of the shifting, that the first pointer is not visually attached to the first data container; and
resize at least one of the first or second data containers so that the first pointer is visually attached to the first data container.

11. The system of claim 8, wherein the metadata layout module is to resize the first data container or the second data container to a predefined size.

12. The system of claim 8, wherein the metadata layout module is to:
determine that the first data container will not be displayed in its entirety within the display; and
shift the first data container so that the first data container is displayed in its entirety.

13. The system of claim 8, wherein the metadata layout module is to resize the first data container by selectively removing data from the first data container.

14. A method comprising:
executing instructions executing instructions on a computing platform to receive binary digital electronic signals representing pixel data, and using the binary digital electronic signals, determine that a first data container and a second data container overlap within a user interface display, the first data container and the second data container corresponding to a respective first pointer being of a fixed size and a respective second pointer being of fixed size, the first pointer to visually join the first data container with a first target item and the second pointer to visually join the second data container with a second target item, the first pointer and second pointer connecting to the data containers at a default position and pointing to the target item and, by default, aligned in the same manner as the target items, the first target item and the second target item being cells in a same row of a spreadsheet, the first and second data container being displayed in one or more predefined linear zones that are positioned so as to cause the first and second data containers to be aligned parallel to the row of the spreadsheet that contain the cells;

responsive to the determining and using one or more processors, executing instructions on a computer platform to automatically shift or resize at least one of the first data container and the second data container while maintaining the fixed size of the first pointer and the second pointer so that the first data container and the second data container do not overlap within the display;

determining that, as a result of the shifting, the first pointer is not visually joined to the first data container;

shifting the first pointer toward the first data container so as to maintain a visual connection with respect to the first pointer; and maintaining an orientation of the first pointer and second pointers so that the first pointer points to the first target item and the second pointer points to the second target item.

15. A non-transitory machine-readable medium having instructions stored therein, wherein the instructions, when executed, cause a machine to perform operation comprising:

determining that a first data container and a second data container overlap within a user interface display, the first and second data containers having respective first and second pointers of a fixed size to visually join the first and second data containers with respective first and second target item, the first pointer and second pointer connecting to the data containers at a default position and pointing to the target item and, by default, aligned in the same manner as the target items, the first target item and the second target item being cells in a same row of a spreadsheet, the first and second data containers being displayed in one or more predefined linear zones that are positioned so as to cause the first and second data containers to be aligned parallel to the row of the spreadsheet that contains the cells;

responsive to the determining and using one or more processors, automatically shifting one or more boundaries of at least one of the first data container or the second data container while maintaining the fixed size of the first and second pointers so that the first data container and the second container do not overlap within the display;

determining that, as a result of the shifting, the first pointer is not visually joined to the first data container;

shifting the first pointer toward the first data container so as to maintain a visual connection with respect to the first pointer; and maintaining an orientation of the first pointer and second pointers so that the first pointer points to the first target item and the second pointer points to the second target item.

16. A method comprising:

receiving identification of a first target item and a second target item within digital content;

generating a first layout of a first annotation data item and a second annotation data item, respectively corresponding to the first target item and the second target item, the generating of the first layout including:

positioning the first annotation data item relative to a first association indicium of fixed extend that is representative of a relationship between the first annotation data item and the first target item, the first association indicium connecting to the first annotation data item at a default position and pointing to the first target item and, by default, aligned in the same manner as the first target item, and positioning the second annotation data item relative to a second association indicium of the fixed extend that is representative of a relationship between the second annotation data item and the second target item, the second association indicium connecting to the second annotation data item at a default position and pointing to the second target item and, by default, aligned in the same manners as the second target item;

determining that the first layout causes the first annotation data item and the second annotation data item to visually overlap to a determinable extend when displayed within a user interface, the first target item and the second target item being cells in a same row of a spreadsheet, the first and second annotation data items being displayed in one or more predefined linear zones that are positioned so as to cause the first and second annotation data items to be aligned parallel to the row of the spreadsheet that contains the cells;

responsive to the determining and using one or more processors, automatically modifying the first layout so that the first annotation data item and the second annotation data item do not visually overlap to the determinable extend;

determining that, as a result of the modifying, a first association indicium of fixed extend is not visually joined to the first annotation data item;

shifting the first association indicium toward the first annotation data item so as to maintain a visual connection with respect to the first association indicium; and maintaining an orientation of the first association indicium and second association indicium so that the first association indicium points to the first target item and the second association indicium points to the second target item without altering the fixed extend of the first association indicium and second association indicium.

17. The method of claim 16, wherein each of the first annotation data item and the second annotation data item is displayed within a respective display container, and the automatically modifying of the layout includes adjusting a size of the respective display container.

18. the method of claim 16, wherein the modifying of the first layout includes repositioning of at least one of the first annotation data item or the second annotation data item relative to the first target item or the second target item.

19. The method of claim 18, wherein repositioning of at least the first annotation data item or second annotation data item is performed within a predefined linear zone of the one or more predefined linear zones of the first layout.

* * * * *

UNITED STATES PATENT AND TRADEMARK OFFICE
CERTIFICATE OF CORRECTION

PATENT NO. : 8,584,008 B1  
APPLICATION NO. : 12/390199  
DATED : November 12, 2013  
INVENTOR(S) : Marissa Dulaney Page 1 of 1

It is certified that error appears in the above-identified patent and that said Letters Patent is hereby corrected as shown below:

In the Claims

In column 17, line 46, in Claim 15, delete "pointers" and insert --pointer--, therefor Signed and Sealed this
Fourteenth Day of January, 2014

Michelle K. Lee
*Deputy Director of the United States Patent and Trademark Office*